US010407234B2

(12) United States Patent
Gabrielson et al.

(10) Patent No.: US 10,407,234 B2
(45) Date of Patent: Sep. 10, 2019

(54) TWO COMPONENT FLUID METERING AND MIXING SYSTEM

(71) Applicants: Henkel Corporation, Rocky Hill, CT (US); Henkel AG & Co. KGaA, Dueseldorf (DE)

(72) Inventors: Karl Eric Gabrielson, Burlington, CT (US); Steven J. Hemsen, Southington, CT (US); Florian Garnich, Munich (DE)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/840,063

(22) Filed: Mar. 15, 2013

(65) Prior Publication Data

US 2014/0061240 A1   Mar. 6, 2014

Related U.S. Application Data

(60) Provisional application No. 61/696,875, filed on Sep. 5, 2012.

(51) Int. Cl.
| | |
|---|---|
| B05C 17/005 | (2006.01) |
| B65D 83/00 | (2006.01) |
| B65D 81/32 | (2006.01) |
| G05D 11/00 | (2006.01) |
| B05C 5/02 | (2006.01) |
| B05C 11/10 | (2006.01) |

(52) U.S. Cl.
CPC ............ *B65D 83/00* (2013.01); *B05C 5/0225* (2013.01); *B65D 81/325* (2013.01); *G05D 11/005* (2013.01); *B05C 11/1002* (2013.01)

(58) Field of Classification Search
CPC ..... B05B 7/32; B05B 12/1418; B05C 5/0225; B29B 7/726; B29B 7/728; B29B 7/748
USPC .............. 222/135, 138, 145.5, 55, 63, 145.6
See application file for complete search history.

(56) References Cited

U.S. PATENT DOCUMENTS

| | | | | |
|---|---|---|---|---|
| 3,067,987 | A * | 12/1962 | Ballou | B01F 15/00253 222/145.6 |
| 3,232,585 | A * | 2/1966 | Garbarino, Jr. | A62C 5/02 137/565.33 |
| 3,887,110 | A * | 6/1975 | Porter | 222/16 |
| 3,915,438 | A * | 10/1975 | Neiley, Jr. | B29B 7/7605 366/160.4 |
| 3,975,128 | A * | 8/1976 | Schluter | 425/207 |
| 4,115,299 | A * | 9/1978 | Muhle | B29B 7/7668 264/53 |
| 4,170,440 | A * | 10/1979 | Gusmer | B05B 7/0018 137/238 |
| 4,175,874 | A * | 11/1979 | Schneider | B29B 7/7668 366/159.1 |
| 4,229,413 | A * | 10/1980 | Marteau d'Autry | 422/517 |
| 4,246,230 | A * | 1/1981 | Hasselman, Sr. | B05B 7/32 261/DIG. 26 |
| 4,332,335 | A * | 6/1982 | Fiorentini | B29B 7/7668 137/242 |

(Continued)

*Primary Examiner* — Charles Cheyney
(74) *Attorney, Agent, or Firm* — Steven C. Bauman

(57) ABSTRACT

The present invention is a two-component fluid dispensing system. In particular, the present invention relates to a two-component fluid dispensing system that uses a dual rotor pump for precision ratio metering and precision fluid flow shut off of a mixed fluid.

18 Claims, 4 Drawing Sheets

(56) References Cited

U.S. PATENT DOCUMENTS

| | | | | |
|---|---|---|---|---|
| 4,341,327 A | * | 7/1982 | Zeitz | 222/63 |
| 4,397,407 A | * | 8/1983 | Skoupi et al. | 222/132 |
| 4,407,431 A | * | 10/1983 | Hutter, III | B01F 3/088 141/107 |
| 4,418,041 A | * | 11/1983 | Johnson | B29B 7/7668 137/625.48 |
| 4,473,531 A | * | 9/1984 | Macosko | B01F 5/0077 422/133 |
| 4,490,048 A | * | 12/1984 | Schlueter | B29B 7/7663 366/134 |
| 4,493,286 A | * | 1/1985 | Carson | B05C 5/00 118/676 |
| 4,809,909 A | * | 3/1989 | Kukesh | B05B 7/24 239/1 |
| 4,812,046 A | * | 3/1989 | Henderickson | B01F 11/0042 222/200 |
| 5,063,027 A | * | 11/1991 | Schneider | B29B 7/7668 366/162.4 |
| 5,271,521 A | * | 12/1993 | Noss | B29B 7/7433 222/1 |
| 5,273,583 A | * | 12/1993 | Langlois | G03G 5/047 118/665 |
| 5,388,761 A | * | 2/1995 | Langeman | 239/1 |
| 5,435,462 A | * | 7/1995 | Fujii | B05C 17/015 222/144.5 |
| 5,499,745 A | * | 3/1996 | Derian | B01F 15/047 222/136 |
| 5,615,949 A | * | 4/1997 | Morano | B29B 7/7626 366/159.1 |
| 5,816,445 A | * | 10/1998 | Gardos | B01F 15/0454 222/1 |
| 5,947,392 A | * | 9/1999 | Molnar et al. | 239/690 |
| 6,079,867 A | * | 6/2000 | Fiorentini | B29C 67/246 366/159.1 |
| 6,092,691 A | * | 7/2000 | Schuerholz | B05C 5/0225 222/1 |
| 6,105,822 A | * | 8/2000 | Larsen | B29B 7/7442 222/134 |
| 6,383,572 B1 | * | 5/2002 | De Graaf | B05B 12/1418 118/300 |
| 6,502,978 B2 | * | 1/2003 | Bonansea | B05B 7/0861 366/162.5 |
| 6,561,266 B1 | * | 5/2003 | Ehrlicher | B01F 5/0656 165/160 |
| 6,682,601 B1 | * | 1/2004 | Beebe | B05C 17/00553 118/669 |
| 6,726,773 B1 | * | 4/2004 | Yanagita | B05B 9/047 118/323 |
| 6,814,110 B2 | * | 11/2004 | Gardos | B29C 39/24 141/198 |
| 6,817,487 B2 | * | 11/2004 | Ross | F04C 13/00 222/145.5 |
| 6,866,171 B2 | * | 3/2005 | Ickinger | B01F 5/045 222/596 |
| 7,097,734 B2 | * | 8/2006 | Hill | 156/335 |
| 7,306,119 B2 | * | 12/2007 | Wootton | B01F 5/0256 222/1 |
| 7,455,446 B2 | * | 11/2008 | Corti | B29B 7/7668 366/162.5 |
| 7,938,295 B2 | * | 5/2011 | Wootton | B29B 7/7615 222/1 |
| 8,197,122 B2 | * | 6/2012 | Reinprecht | A61B 17/00491 366/155.2 |
| 8,272,537 B2 | * | 9/2012 | Varga | G01F 11/00 141/11 |
| 9,079,335 B2 | * | 7/2015 | Schuler | B29B 7/407 |
| 2006/0131332 A1 | * | 6/2006 | Khalaf | B01F 7/00908 222/135 |
| 2007/0000947 A1 | * | 1/2007 | Lewis | B01F 13/1055 222/132 |

* cited by examiner

TWO COMPONENT FLUID METERING AND MIXING SYSTEM

FIELD OF THE INVENTION

The present invention is a two-component fluid dispensing system. In particular, the present invention relates to a two-component fluid dispensing system that uses a dual rotor pump for precision ratio metering and precision fluid flow shut off of a mixed fluid.

BACKGROUND OF INVENTION

Fluid dispensing systems are generally used to mix two components to form a desired mixture. In many applications, it is necessary to precisely control the amount of each component that is added to form the mixture. Such fluid dispensing systems are often used to form an epoxy, acrylate, polyurethane or silicone that can be used as an adhesive. The process of polymerization is called "curing" and can be controlled through temperature, choice of resin and hardener compounds, and the ratio of these compounds. The choice of temperature, resin and hardener can result in the curing process taking minutes to hours. Some formulations benefit from heating during the cure period, whereas others simply require time and ambient temperatures.

These adhesives typically require a precise mix of the two components that are mixed together to form the desired third chemical. Depending on the properties required, the ratio may vary from 1:1 or over 10:1. However, in order for the final product to be a precise formulation, the resin and hardener must be mixed at an exact ratio. Until they are mixed the two components are relatively inert, although the "hardeners" tend to be more chemically active and require more protection from the atmosphere and moisture. The rate of the reaction can be changed by using different hardeners, which may change the nature of the final product, or by controlling the temperature.

Prior art volumetric systems for mixing two fluids (e.g., a resin and a hardener) at an exactly prescribed ratio suffer from the problem that the metering of the material is located at significant distances (1-2 meters or more of tubing) from the application dispense point. This causes fluctuations in ratio control resulting in inexact mixing of the two components and, consequently, unacceptable variances in the bonding strength of the adhesive. The prior art systems perform the mixing more like a pressure-time dispense system than a true volumetric mixing system, which is critical for accurate ratio control. Accordingly, there is a need for a dispense system that accurately mixes the two components at a precise ratio in order to provide a mixture with the desired chemical composition.

SUMMARY OF THE INVENTION

In accordance with the present invention, a two-component fluid dispensing system is provided for mixing and dispensing two fluid components. The fluid dispensing system includes a dual pump, a static mixer and an anti-drip valve. The dual pump supplies the two fluid components and has first and second pump discharges. The dual pump can be selected from a group of rotary pumps consisting of a dual rotor pump, a dual eccentric rotor pump, a dual auger pump, a dual gear pump, or a similar family of dual pumps. The dual pump can also be selected from a group of linear pumps consisting of piston pumps and rod pumps. The static mixer is hydraulically coupled to the first and second pump discharges and receives the two fluid components for mixing the components therein and discharging via an exit. Preferably, the static mixer is elongate and is hydraulically coupled at one end to the two pump discharges and at the other end to the anti-drip valve. The anti-drip valve is hydraulically coupled to the exit of the static mixer for controlled on-off dispensing of the mixed fluid components. Preferably, the anti-drip valve is a rigid body needle valve.

The dual pump, the static mixer and the anti-drip valve form a moveable assembly, which is movable about the work piece onto which the mixed fluid is dispensed. In another embodiment, the static mixer and the anti-drip valve are movable about the working piece and the dual pump is positionally fixed and hydraulically coupled to the static mixer. The dual pump is fed from a dual cartridge pusher. Preferably, the dual pump is fed by dual feed lines connected between the dual cartridge pusher and the dual pump. The dual cartridge pusher is operable to dispense the fluid composition by using two independently movable plungers so as to provide unrestricted, independent fluid flow to each rotor pump; thereby establishing the dual rotor pumps as the only ratio determinant The independently movable plungers are independently positionally monitored so as to measure the dispensing ratio of the two fluid compositions.

BRIEF DESCRIPTION OF THE FIGURES

The preferred embodiments of the two-component fluid dispensing system of the present invention, as well as other objects, features and advantages of this invention, will be apparent from the accompanying drawings wherein.

DETAILED DESCRIPTION OF THE INVENTION

Figure 1:
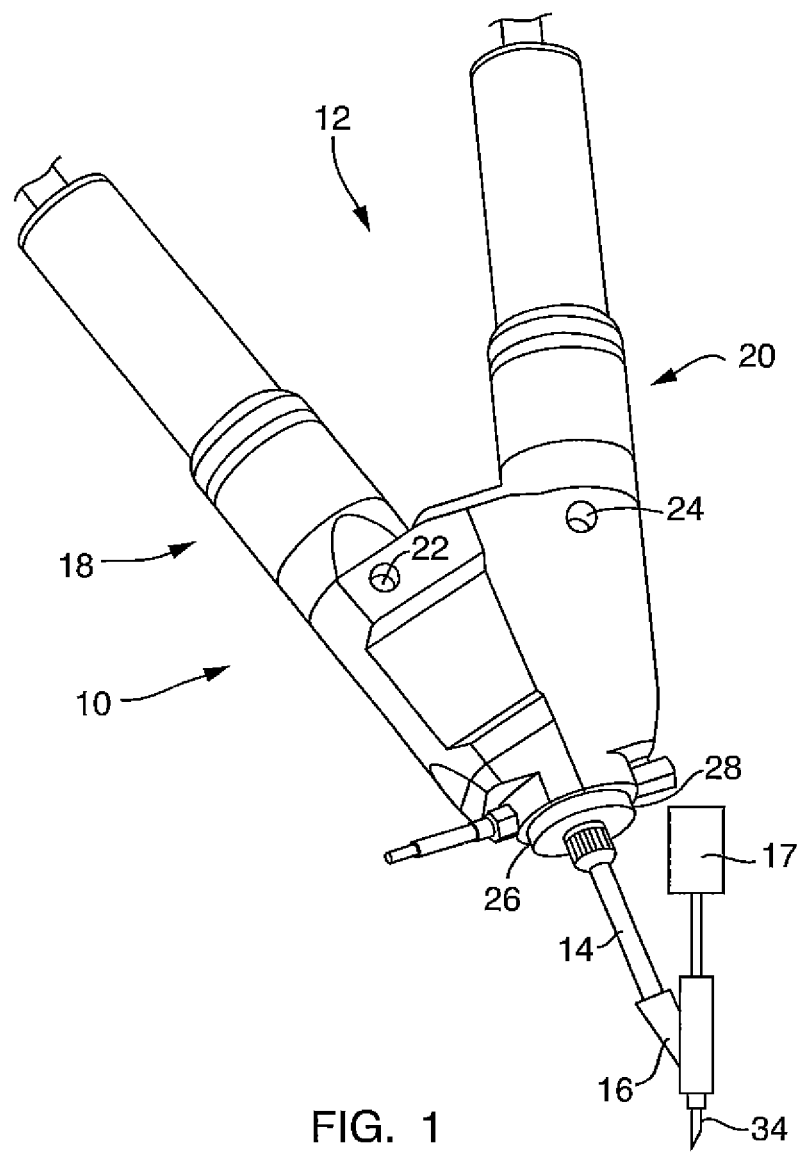
FIG. 1 is a rear view of the assembly formed by the dual rotor pumps, the static mixer, and the anti-drip valve.

The present invention is a two-component fluid dispensing system that solves the problem of inaccurate ratio dispensing and drooling or dripping of the fluid when flow stops. The system includes a volumetric displacement, dual rotor pump device for metering two fluids. The fluid input for each component is supplied by a single device (dual cartridge pusher), which can deliver the fluids independently to the pump at independent pressures. This design ensures that neither fluid input to the pump is starved for material while pumping. The material flows independently from each outlet port (also referred to herein as the "discharge port") of the dual pump into a mixing nozzle (also referred to herein as a "static mixer"), which merges the two fluid materials together based on the flow volume and speed of each independent channel of the dual pump. The mixing nozzle is directly coupled to an anti-drip valve, which opens and closes to control the flow of the mixed material that is dispensed. Without the anti-drip valve, the shut off capability of the dual pump itself would not be sufficient for clean and precise shut off of the fluid flow. The close proximity of the metering dual pump and the anti-drip valve to the application dispense point is the key to accurate ratio control of one material to the other and the precision shut off of fluid flow. Preferably, the distance between the two pump discharges and the anti-drip valve is less than 12 inches, and more preferably less than 6 inches.

In one embodiment, the anti-drip valve for precision dispensing of a fluid from a cartridge includes a y-shaped anti-drip valve body and a poppet. The anti-drip body is constructed of a rigid material, and includes a vertical part and an angled part. The vertical part has a vertical channel therethrough and the angled part has an angled channel therethrough. The angled channel extends from the vertical channel, and carries the mixed fluid composition from the angled part to the vertical part. The poppet has a rod with a mushroom shaped end to provide on/off control. The poppet extends through the vertical channel and beyond the top open end and the bottom open end. The poppet is vertically movable within the vertical channel to regulate the flow through the anti-drip valve.

In one preferred embodiment (FIGS. 1 and 2), the dual rotor pump includes two eccentric rotor pumps (also referred to herein as "metering pumps") powered by two separate electric motor drives with a potentiometer for flow rate adjustment. A controller is used to adjust the mix ratio and the dispense volume settings. The separate motor drives allow continuous adjustment of mix ratios from 1:1 to 1:10. The discharges from the two rotor pumps are directly coupled to the static mixer to provide precise control of the mix ratio.

The static mixer includes two inlet ports for connecting to the two discharges of the dual rotor pump and a single outlet port that is connected to the anti-drip valve. The static mixer, also referred to as a motionless mixer, is a narrow cylindrical tube which contains mixing elements. The elements are stationary parts that are positioned to force the two materials to combine as they travel through the length of the mixer. After traveling the length of the mixer, the mixed material is discharged to the anti-drip valve. The dimensions of the static mixer can vary to accommodate different volumes of materials and to control the amount of mixing. The anti-drip valve controls the on-off discharge of the mixed materials so that a precise amount of the materials can be deposited on a surface.

The dual cartridge adhesive feed system (also referred to herein as the "dual cartridge pusher") can deliver the fluids independently to each pump at independent pressures. The two cartridge containers are designed so that the cross sectional area of the cavity in the longitudinal extension of the container is constant. Preferred cartridges are hollow cylindrical containers having a constant diameter, in particular the inside diameter is constant in order to maintain a consistent discharge flow. The cartridges can have a fixed outer casing, in particular with a round, rectangular or polygonal cross-section, and a cavity for receiving the dispensed mass. On the distal end, the cartridge can have a nozzle shape having a dispensing opening connected to one of the metering pumps. On the proximal end, the cartridge cavity is typically closed by a piston-type plunger, which fits tightly against the inner wall and is actuated by a slidably adjustable rod to dispense the mass within the cavity. The actuator for the rod may be a linear motor, a stepping motor or other electrically, pneumatically or hydraulically operated drive devices. The actuating rods maintain a constant pressure on the fluids in the two cartridges to ensure that there is a constant flow of fluid to the two metering pumps.

The two-component fluid dispensing system can be formed as an assembly with the two discharges of the dual rotor pump closely coupled to the two inlet ports of the static mixer and the anti-drip valve connected to the discharge port of the static mixer. Flexible wiring is used to power the two dual rotor pump motors and the two fluids to be mixed are fed to the two dual rotor pump inlets through flexible hoses or tubing. This allows the assembly to freely move about a work piece and facilitates the incorporation of the assembly into a robotic system.

Figure 2:
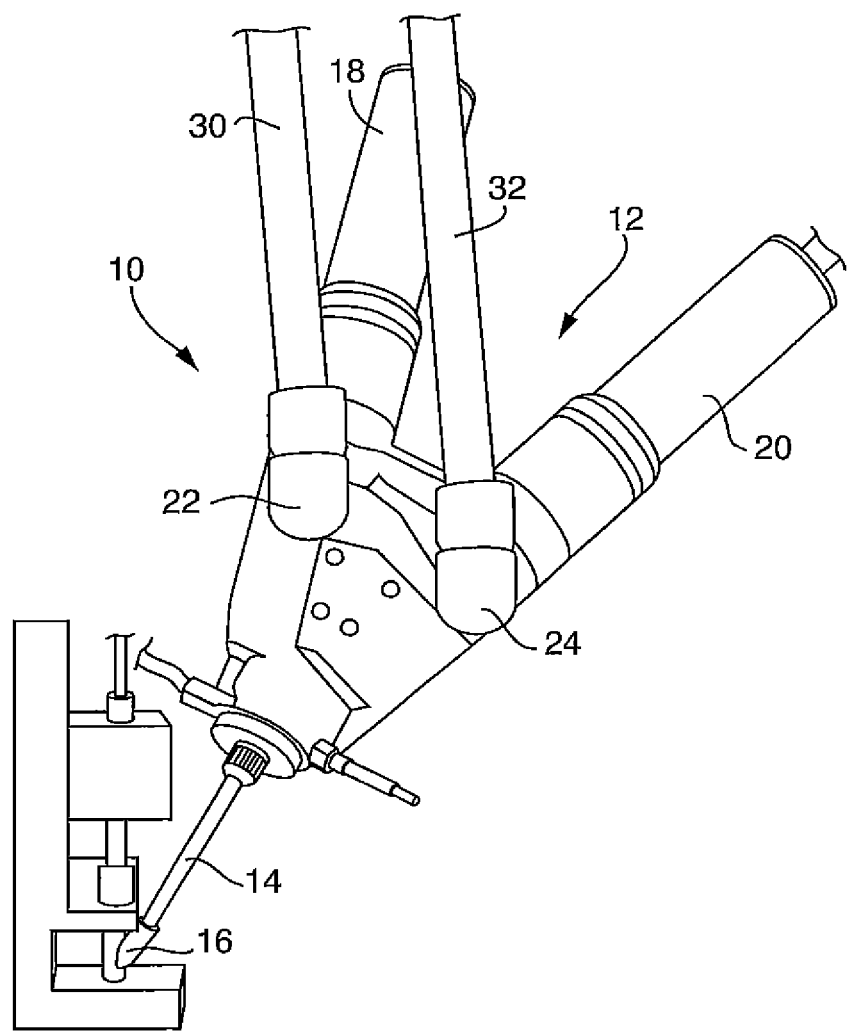
FIG. 2 is a front view of the assembly formed by the dual pump, the static mixer and the anti-drip valve.

FIGS. 1 and 2 show an embodiment of the two-component fluid dispensing system 10 that includes a dual rotor pump 12, a static mixer 14 and an anti-drip valve 16. The dual rotor pump 12 includes two rotor pumps 18, 20 with separate inlet ports 22, 24 and discharge ports 26, 28. The discharge ports 26, 28 are closely coupled to the two inlets (not shown) for the static mixer 14 to provide accurate mixing of the two materials.

FIG. 2 shows two fluids 30, 32 being fed under pressure into the inlet ports 22, 24 of the rotor pumps 18, 20 and then pumped into the static mixer 14. The two fluids 30, 32 are intimately mixed in the static mixer 14 and then discharged through the anti-drip valve 16. The mixture discharged from the anti-drip valve 16 can be optionally discharged through a dispense tip 34. The on-off actuation of the anti-drip valve 16 is controlled by an actuator 17.

In another preferred embodiment (FIG. 3), the dual pump includes linear displacement pumps, in this case, a dual rod pump system, powered by two pneumatic actuators. The mix ratio is determined by the rod diameters, and the dispense volume is determined by the linear stroke of the rods. The discharges from the dual rod pumps are hydraulically coupled to the static mixer to provide precise control of the mix ratio.

The static mixer includes two inlet ports for connecting to the two discharges of the dual rod pumps, and a single outlet port that is connected to the anti-drip valve. The static mixer, also referred to as a motionless mixer, is a narrow cylindrical tube which contains mixing elements. The elements are stationary parts that are positioned to force the two materials to combine as they travel through the length of the mixer. After traveling the length of the mixer, the mixed material is discharged to the anti-drip valve. The dimensions of the static mixer can vary to accommodate different volumes of materials and to control the amount of mixing. The anti-drip valve controls the on-off discharge of the mixed materials so that a precise amount of the materials can be deposited on a surface.

The two-component fluid dispensing system 10 can optionally be formed as a moveable "assembly" with the two discharges of the dual rod pumps closely coupled to the two inlet ports of the static mixer and the anti-drip valve connected to the discharge port of the static mixer. The two fluids to be mixed are fed to the two dual rod pump inlets through flexible hoses or tubing. This allows the assembly to freely move about a work piece and facilitates the incorporation of the assembly into a robotic system.

Figure 3:
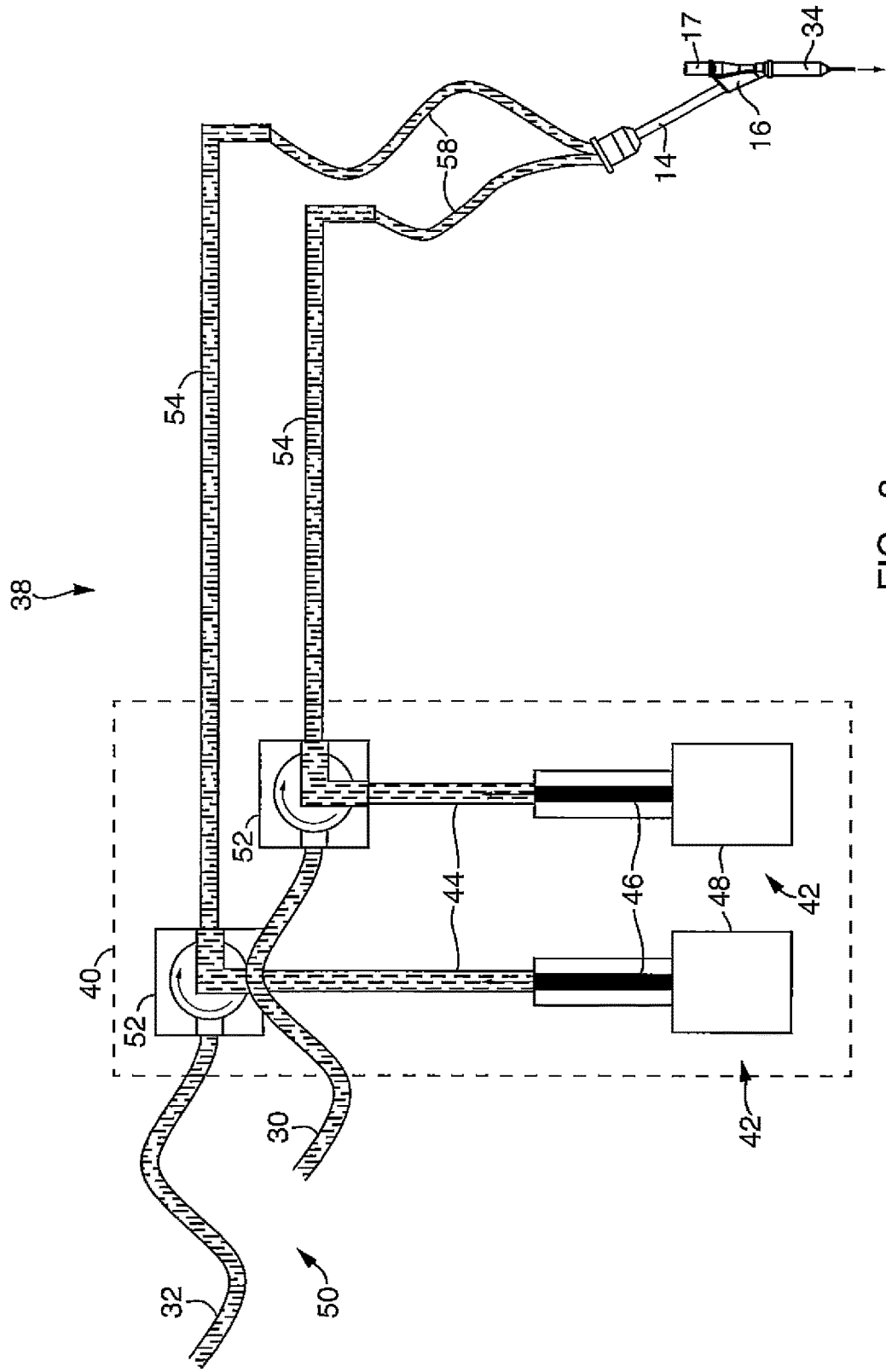
FIG. 3 is a side view of the assembly formed by the dual pump, the static mixer and the anti-drip valve.

FIG. 3 shows an embodiment of the two-component linear displacement fluid dispensing system 38 that includes a stationary dual rod pump system 40, and a moveable static mixer 14 and anti-drip valve 16 assembly. The dual rod pump system 40 includes two separate rod metering pumps 42, each comprised of a metering tube 44, a metering rod 46, and an actuator 48.

In the dispensing mode (shown), the rod metering pumps 42 advance by power from the actuators 48 to discharge two fluids 30, 32 to directional valve 52. The two fluids 30, 32 pass through the directional valve 52 to hard pipe 54 and flexible tube 56, and enter the two inlets (not shown) on static mixer 14 to provide accurate mixing of the two fluids 30, 32. The two fluids 30, 32 are intimately mixed in the static mixer 14 and then discharged through the anti-drip valve 16. The mixture discharged from the anti-drip valve 16 can be optionally discharged through a dispense tip 34. The on-off actuation of the anti-drip valve 16 is controlled by an actuator 17.

In the re-filling mode (not shown), directional valves 52 rotate 90 degrees, creating a hydraulic connection between the adhesive feed system 50 and the rod metering pumps 42. The metering rods 46 then retract to allow re-filling of metering tubes 44 with the two fluids 30, 32.

Figure 4:
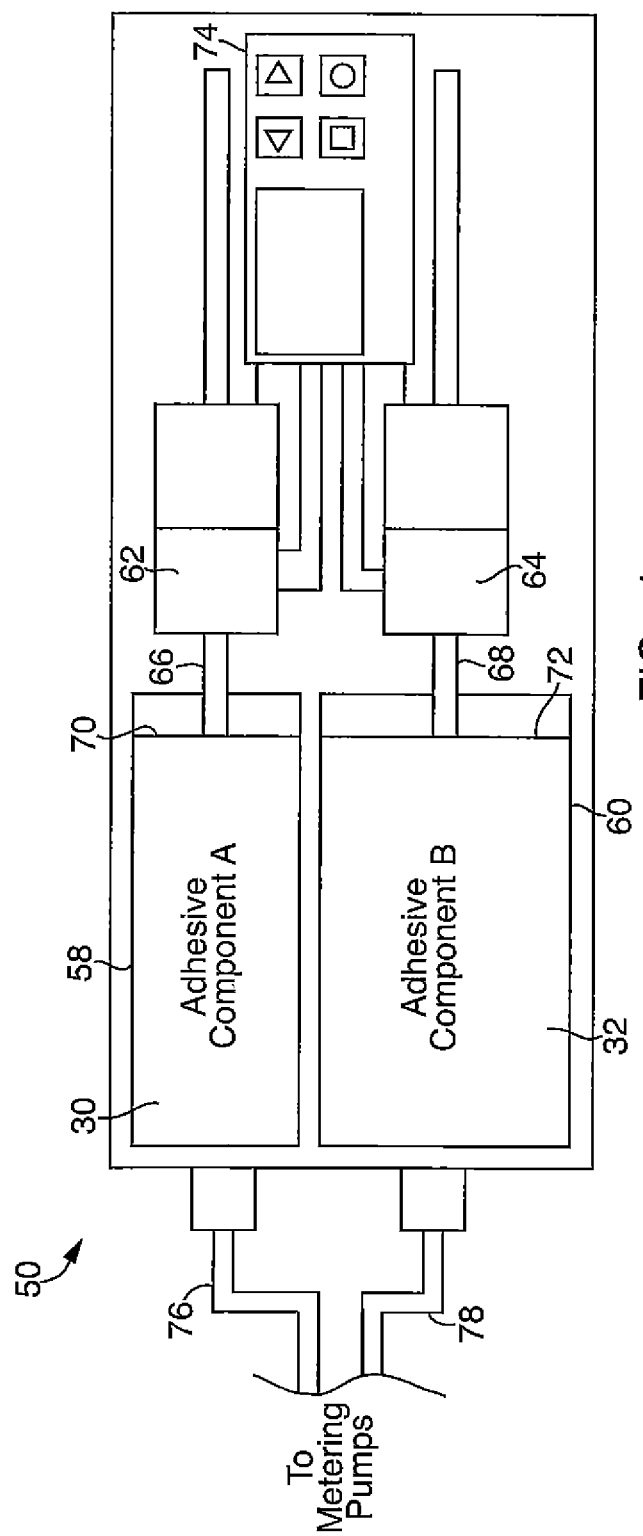
FIG. 4 is a plan view of the dual cartridge adhesive feed system.

FIG. 4 shows a schematic plan view of the dual cartridge adhesive feed system 50 for outputting the two fluid components 30, 32 of a two-component adhesive to metering pumps 18, 20. The dual cartridge adhesive feed system 50 includes two cartridges 58, 60 containing the two fluid components 30, 32, respectively, and independent propulsion devices 62, 64 for actuating plunger rods 66, 68 connected to plungers 70, 72 inside the cartridges 58, 60. The output of the fluids 30, 32 from the cartridges 58, 60 is decoupled, which means that each of the fluids 30, 32 can be discharged independently of the other and the propulsion devices 62, 64 can be operated independently. The dual cartridge adhesive feed system 50 can also include a control unit 74 for processing input data to calculate and display the output volume of the fluids 30, 32 and control the propulsion devices 62, 64. In particular, the control unit 74 controls the correct dosage of the two fluids 30, 32 and allows the fluid flows to be independently adjusted. The two fluids 30, 32 are discharged via respective product hoses 76, 78 to the two metering pumps 18, 20.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A fluid dispensing system for mixing and dispensing two fluid components comprising:
   a dual pump for supplying said two fluid components each at controlled flow and having first and second pump discharge ports;
   a static mixer having two inlet ports, said two inlet ports of said static mixer hydraulically and directly coupled to said first and second pump discharge ports of the said dual pump for receiving said two fluid components for mixing said components therein and discharging via an exit; and
   an anti-drip valve hydraulically coupled to the exit of said static mixer for controlled on-off dispensing of said mixed fluid components;
   wherein said dual pump, said static mixer and said anti-drip valve form an assembly, which is movable about a work piece onto which said mixed fluid is dispensed;
   wherein said anti-drip valve defines a longitudinal channel extending along a longitudinal axis and an angled channel hydraulically connected to said longitudinal channel at an angle to said longitudinal axis;
   wherein the dual pump comprises a first pump fluidly connected to the first pump discharge port and a second pump fluidly connected to the second pump discharge port; and
   wherein the first pump is arranged non-parallel to the second pump such that an end of the first pump and an end of the second pump converge towards each other.

2. A fluid dispensing system of claim 1 wherein said dual pump is a dual rotor pump.

3. A fluid dispensing system of claim 1 wherein said static mixer is elongate and is hydraulically coupled at one end to said pump and at the other end to said anti-drip valve.

4. A fluid dispensing system for mixing and dispensing two fluid components, the dispensing system comprising:
   a dual pump for supplying said two fluid components each at controlled flow and having first and second pump discharge ports;
   a static mixer having two inlet ports, said two inlet ports of said static mixer hydraulically and directly coupled to said first and second pump discharge ports of the said dual pump for receiving said two fluid components for mixing said components therein and discharging via an exit; and
   an anti-drip valve hydraulically coupled to the exit of said static mixer for controlled on-off dispensing of said mixed fluid components;
   wherein said static mixer and said anti-drip valve are movable about a work piece and said dual pump is positionally fixed and hydraulically coupled to said static mixers
   wherein the dual pump comprises a first pump fluidly connected to the first pump discharge port and a second pump fluidly connected to the second pump discharge port;
   wherein the first pump is arranged non-parallel to the second pump such that an end of the first pump and an end of the second pump converge towards each other; and
   wherein said anti-drip valve defines a longitudinal channel extending along a longitudinal axis and an angled channel hydraulically connected to said longitudinal channel at an angle to said longitudinal axis.

5. A fluid dispensing system of claim 1 wherein said dual pump is fed said fluid components from a dual cartridge pusher.

6. A fluid dispensing system of claim 5 wherein said dual pump is fed said fluid components by dual feed lines connected between said dual cartridge pusher and said dual pump.

7. A fluid dispensing system of claim 5 wherein said dual cartridge pusher is operable to feed said fluid components by using two independent plungers.

8. A fluid dispensing system of claim 1 wherein said dual pump includes first and second inlet ports.

9. A fluid dispensing system of claim 1 wherein said anti-drip valve is a rigid body needle valve.

10. A fluid dispensing system of claim 1 wherein said static mixer is hydraulically connected to said angled channel of said anti-drip valve.

11. A fluid dispensing system of claim 1, wherein the end of the first pump and the end of the second pump converge towards each other such that said two inlet ports of said static mixer are hydraulically and directly coupled to said first and second pump discharge ports of the said dual pump for receiving said two fluid components for mixing said components therein.

12. A fluid dispensing system of claim 4 wherein said dual pump includes first and second inlet ports.

13. A fluid dispensing system of claim 4 wherein said anti-drip valve is a rigid body needle valve.

14. A fluid dispensing system of claim 4 wherein said static mixer is hydraulically connected to said angled channel of said anti-drip valve.

15. A fluid dispensing system of claim 4 wherein the end of the first pump and the end of the second pump converge towards each other such that said two inlet ports of said static mixer are hydraulically and directly coupled to said first and second pump discharge ports of the said dual pump for receiving said two fluid components for mixing said components therein.

16. A fluid dispensing system for mixing and dispensing two fluid components comprising:
- a dual pump for supplying said two fluid components each at controlled flow and having first and second pump discharge ports;
- a static mixer having two inlet ports, said two inlet ports of said static mixer hydraulically and directly coupled to said first and second pump discharge ports of the said dual pump for receiving said two fluid components for mixing said components therein and discharging via an exit;
- an anti-drip valve hydraulically coupled to the exit of said static mixer for controlled on-off dispensing of said mixed fluid components;
- wherein the distance between the first and second pump discharge ports of the dual pump and the anti-drip valve is less than 12 inches;
- wherein the dual pump comprises a first pump fluidly connected to the first pump discharge port and a second pump fluidly connected to the second pump discharge port;
- wherein the first pump is arranged non-parallel to the second pump such that an end of the first pump and an end of the second pump converge towards each other; and
- wherein said anti-drip valve defines a longitudinal channel extending along a longitudinal axis and an angled channel hydraulically connected to said longitudinal channel at an angle to said longitudinal axis.

17. A fluid dispensing system of claim 16, wherein the distance between the first and second pump discharge ports of the dual pump and the anti-drip valve is less than 6 inches.

18. A fluid dispensing system of claim 16, wherein the end of the first pump and the end of the second pump converge towards each other such that said two inlet ports of said static mixer are hydraulically and directly coupled to said first and second pump discharge ports of the said dual pump for receiving said two fluid components for mixing said components therein.

* * * * *